(12) United States Patent
Ushida et al.

(10) Patent No.: US 6,486,714 B2
(45) Date of Patent: Nov. 26, 2002

(54) HALF-BRIDGE INVERTER CIRCUIT

(75) Inventors: Atsuya Ushida, Oizumi-machi (JP); Kenji Ikeda, Oizumi-machi (JP); Takaaki Saito, Ora-machi (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 10/059,276

(22) Filed: Jan. 31, 2002

(65) Prior Publication Data

US 2002/0118049 A1 Aug. 29, 2002

(30) Foreign Application Priority Data

Jan. 31, 2001 (JP) ........................................ 2001-023683

(51) Int. Cl.[7] .............................................. H05B 37/02
(52) U.S. Cl. ....................................... 327/108; 327/112
(58) Field of Search ................................. 327/108, 112, 327/110; 315/307

(56) References Cited

U.S. PATENT DOCUMENTS

| | | | | |
|---|---|---|---|---|
| 4,733,104 A | * | 3/1988 | Steigerwald et al. | 327/176 |
| 5,684,686 A | * | 11/1997 | Reddy | 363/97 |
| 6,002,213 A | * | 12/1999 | Wood | 315/307 |
| 6,081,438 A1 | * | 6/2001 | Saint-Pierre et al. | 363/95 |

* cited by examiner

*Primary Examiner*—Dinh T. Le
(74) *Attorney, Agent, or Firm*—Morrison & Foerster LLP

(57) ABSTRACT

In a drive circuit of a half-bridge inverter circuit, a stable operation cannot be performed at a start-up time and a problem exists such that if a high side output signal is first outputted, main switching elements and are simultaneously turned on. In the present invention, a start-up circuit comprising a latch circuit and a gate circuit are provided, the latch circuit is set while prioritizing a low-side signal, and a low-side output signal is always first made high level, thereby realizing a half-bridge inverter circuit which can start up wit a stability.

4 Claims, 5 Drawing Sheets

HALF-BRIDGE INVERTER CIRCUIT

BACKGROUND OF THE INVENTION

1. Field of the Invention

The present invention relates to a half-bridge inverter circuit and, in particular, to a half-bridge inverter circuit to which a load driven at a high voltage is connected.

2. Description of the Related Art

A configuration of a half-bridge inverter circuit for lighting is shown in FIG. 1. Q1 and Q2 denote main switching elements, each including a power MOSFET. D1 and D2 are resonance current-commutating diodes, each including a parasitic diode between the drain and source of the power MOSFET. In a ballast circuit, L denotes a resonance reactor, C1 denotes a direct current component-cutting capacitor, C2 denotes a filament-preheating capacitor, and a circuit configuration is provided such that a fluorescent lamp 3 is connected in parallel with the filament-preheating capacitor C2.

FIG. 2 shows operating waveforms when the lamp of the circuit of FIG. 1 is on. VGS1 and VGS2 denote gate-source voltages of the main switching elements Q1 and Q2, respectively. During operation, the main switching elements Q1 and Q2 are alternately repeatedly turned on and off, and in order to prevent the main switching elements Q1 and Q2 from simultaneously being turned on, dead time periods, during which both main switching elements Q1 and Q2 are off, are provided.

The high-side main switching element Q1 is turned on when VGS1 becomes high and a drain current shown by ID1 flows. Thereby, a square wave voltage is applied to the ballast circuit composed of L, C1, C2 and fluorescent lamp 3, and a sine wave-shaped ballast current I1 flows. The ballast current I1 when the lamp is on is a composite current formed of a filament current I2 and a lamp current I3.

The low-side main switching element Q2 is turned on when VGS2 becomes high and a drain current ID2 flows. When that happens, energy which has been accumulated in the ballast circuit is discharged and the ballast current I1, the filament current I2, and the lamp current I3 decrease in the negative direction.

In an ordinary half-bridge inverter circuit, operations are carried out at a frequency in a delayed phase band which is higher than a resonance frequency. Accordingly, since the ballast current I1 can be changed by a switching frequency of the main switching elements Q1 and Q2, it becomes possible to adjust brightness.

Referring to FIG. 1, an input signal from a control circuit 1 is converted to appointed drive signals (for example, VGS1 and VGS2) at a drive circuit 2, whereby the main switching elements Q1 and Q2 are driven.

A detailed circuit block of this drive circuit 2 is shown in FIG. 6. This drive circuit 2 includes a signal input circuit 21, dead time control circuits 22 and 23 which perform dead time control on the high side and the low side, respectively, a pulse generating circuit 24, a level shifting circuit 25, a pulse filter circuit 26, a latch circuit including an RS flip-flop circuit 27, and output circuits 28 and 29 which supply drive signals HO and LO for driving the main switching elements Q1 and Q2 on the high side and the low side.

In such a drive circuit 2, an output signal from the control circuit 1 is shaped by the signal input circuit 21, then inputted into the dead time control circuits 22 and 23 which perform dead time control on the high side and the low side, and as shown in FIG. 7, a high-side output signal HO, which is delayed from the input signal (output signal from the control circuit 1), and a low-side output signal LO, which falls before the high-side output signal HO rises, are formed. For the high-side output signal HO and the low-side output signal LO, dead time periods are provided during which both become low level so that the main switching elements Q1 and Q2 are not simultaneously turned on.

In the drive circuit 2 on the high side, since the main switching element Q1 is driven at a voltage of approximately 600V, it is necessary to form a drive signal VGS1 by shifting the high-side output signal HO to a high voltage of approximately 600V. An output signal PGIN from the dead time control circuit 22 is inputted into the pulse generating circuit 24 and a set output signal OUT (Set) and a reset output signal OUT (Reset) are outputted therefrom. These signals are inputted into the subsequent level shifting circuit 25 for shifting to a high voltage and converted to a high-voltage set output signal OUT (Set) and a high-voltage reset output signal (Reset). These signals allow signals of a predetermined pulse width or longer to pass through the pass filter circuit 26, thereby setting and resetting the latch circuit 27, and a high side output signal HO is outputted from the output circuit 28, thereby driving the main switching element Q1 on the high side.

In such a half-bridge inverter circuit, in order to prevent the main switching elements Q1 and Q2 from simultaneously being turned on, dead times are provided during which both drive signals (for example, VGS1 and VGS2) are off.

However, at a start-up time, it is uncertain whether a high-side output signal is first outputted from the drive circuit or a low-side output signal is first outputted therefrom, and therefore a stable start-up condition cannot be obtained. A problem exists that if the high-side output signal is first outputted, the main switching elements Q1 and Q2 are simultaneously turned on.

SUMMARY OF THE INVENTION

The present invention is provided to solve the foregoing problem such that at a start-up time two main switching elements simultaneously may turn to the on-mode, and provides a half-bridge inverter circuit including dead time control circuits on the high side and the low side which form dead time periods based on an input signal to be inputted from a control circuit, and a start-up circuit including a latch circuit, which is reset upon detection of a rise in power supply on the low side, then set by a low-side output signal from the dead time control circuit on the low side, and a gate circuit, which receives the low-side output signal in response to an output from the latch circuit, then allows a high-side output signal from the dead time control circuit on the high side to pass. This configuration prevents the two main switching elements from being simultaneously turned on at a start-up time.

According to the present invention, by providing the start-up circuit which prioritizes a low side signal, the main switching element on the low side is always first turned on at start-up. Thus, an advantage exists such that a stable start-up of the half-bridge inverter circuit can be performed.

DETAILED DESCRIPTION OF THE INVENTION

An embodiment of the present invention will be described in detail with reference to FIGS. 3, 4, 5A and 5B.

Figure 1:
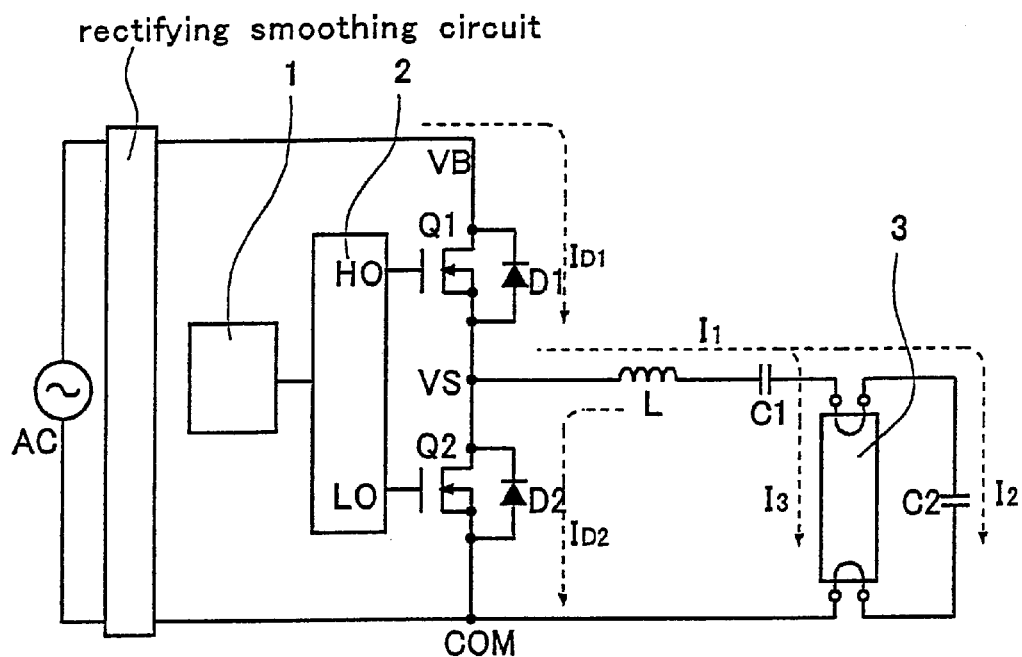
FIG. 1 is a diagram for explaining a half-bridge inverter circuit according to the present invention and prior art.
Figure 3:
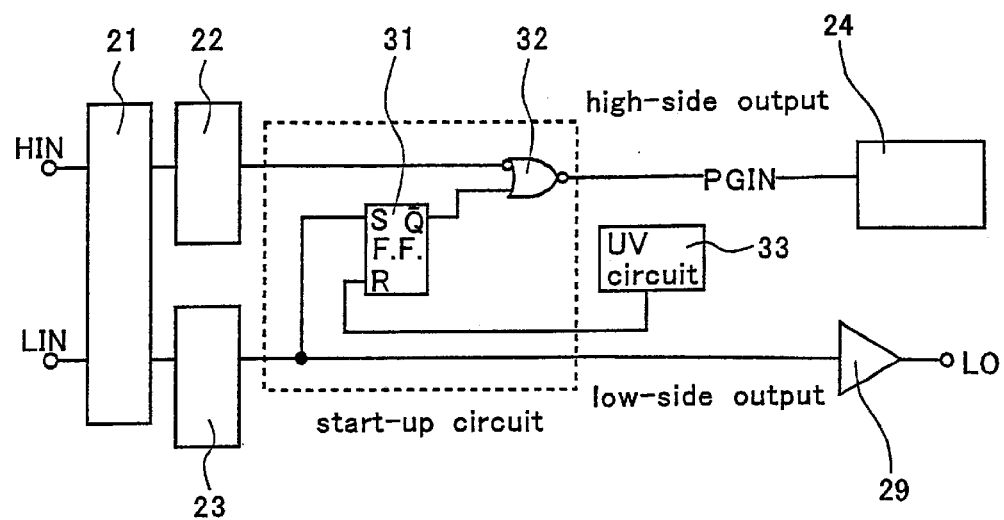
FIG. 3 is a diagram for explaining a start-up circuit of the half-bridge inverter circuit according to an embodiment of the present invention.
Figure 6:
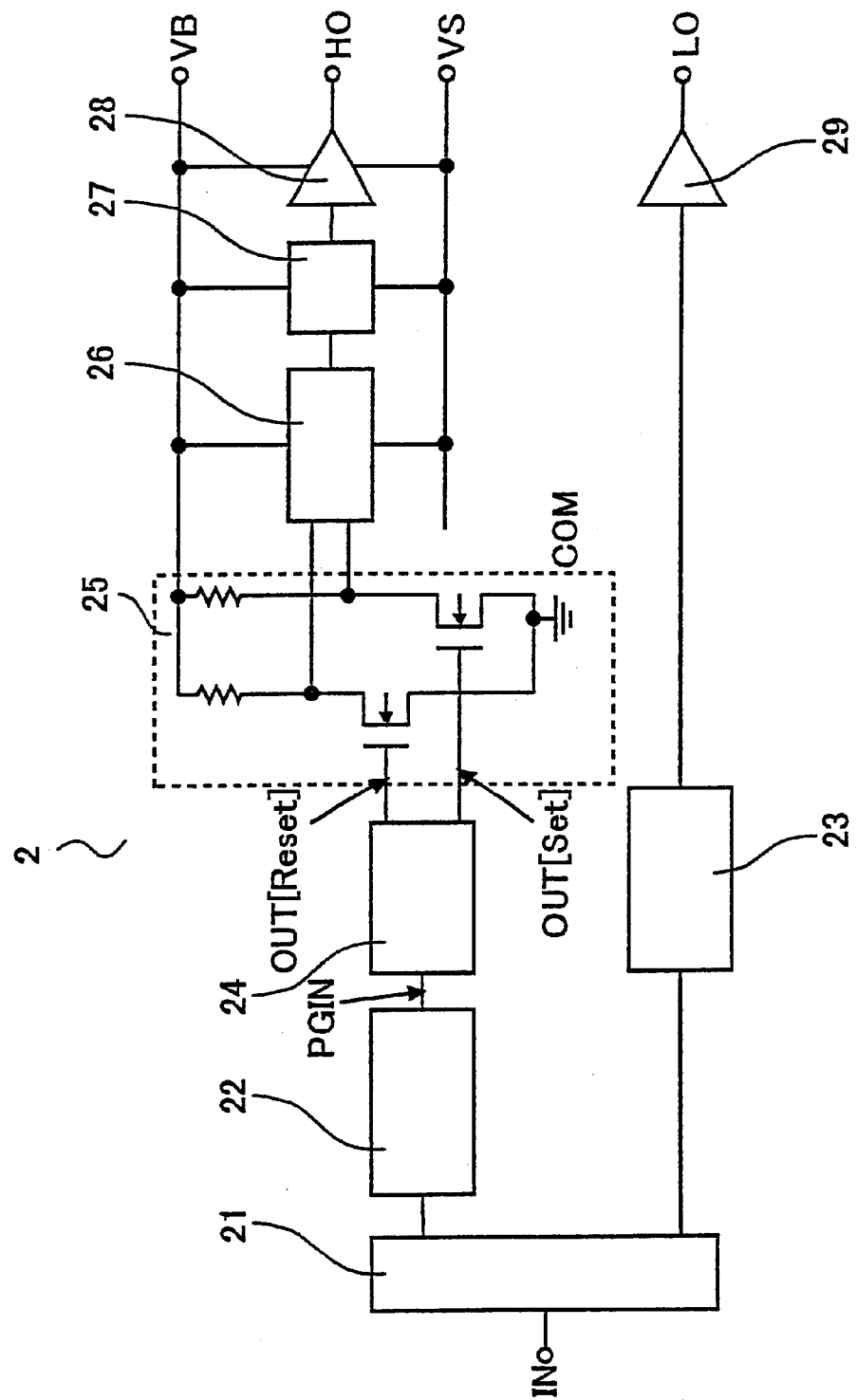
FIG. 6 is a diagram for explaining a drive circuit of the half-bridge inverter circuit according to the present invention and prior art.
Figure 7:
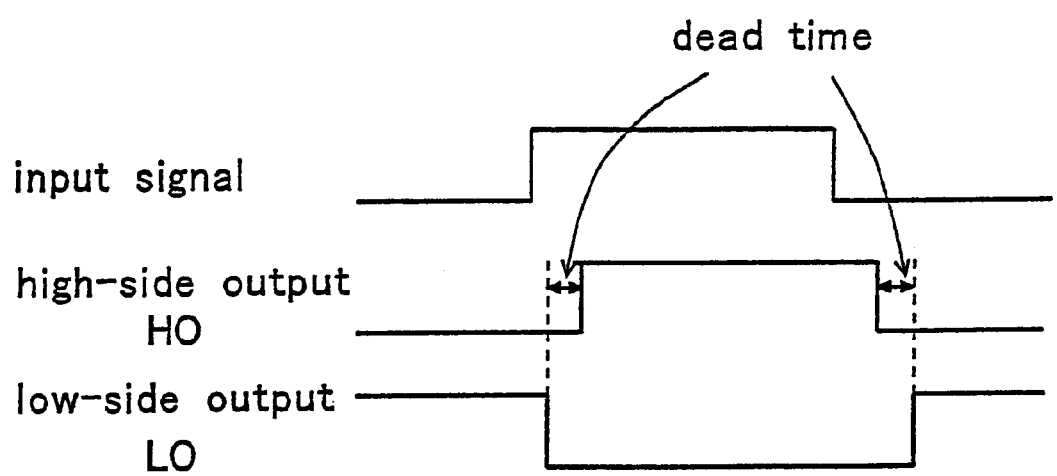
FIG. 7 is a diagram for explaining operations of a drive circuit of the half-bridge inverter circuit according to the present invention and prior art.

The half-bridge inverter circuit of this invention includes a start-up circuit (denoted by the dotted rectangular in FIG. 3) and a power-supply voltage detection circuit 33 of FIG. 3, which cooperate with other components of the conventional driver circuit of FIG. 6 to operate as a driver circuit of this embodiment. Besides the driver circuit, the half-bridge inverter circuit of this invention also includes components of the conventional half-bridge inverter circuit of FIG. 1. Many of the conventional components are omitted from FIG. 3 for simplicity.

Accordingly, the half-bridge inverter circuit of this invention includes main switching elements Q1, Q2, each including a power MOSFET, and resonance current-commutating diodes D1, D2, each including a parasitic diode between the drain and source of the power MOSFET. In a ballast circuit, there provided a resonance reactor L, a direct current component-cutting capacitor C1, and a filament-preheating capacitor C2, so that a fluorescent lamp 3 is connected in parallel with the filament-preheating capacitor C2. The inverter circuit of this invention also includes a dead time control circuit on a high side 22 and a dead time control circuit on a low side 23.

Figure 2:
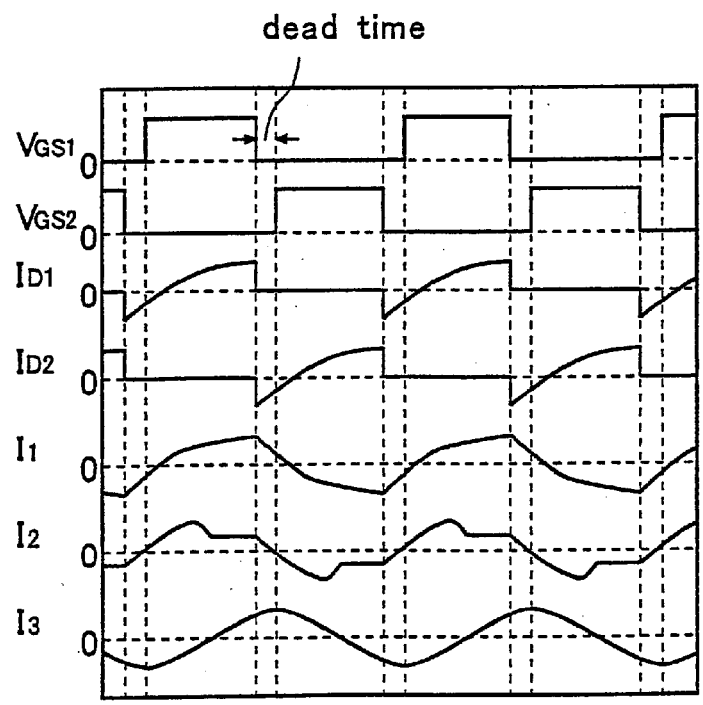
FIG. 2 is a diagram for explaining operating waveforms of a half-bridge inverter circuit according to the present invention and prior art.
Figure 4:
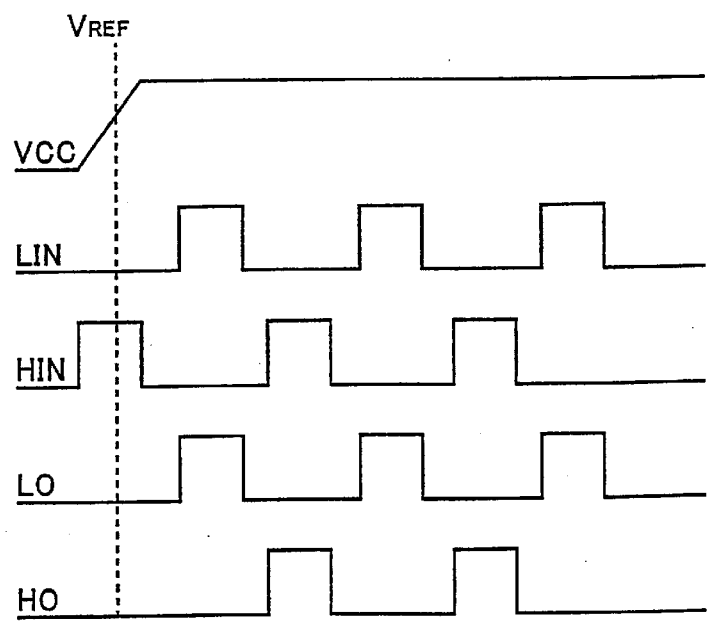
FIG. 4 is a diagram for explaining operating waveforms of a start-up circuit of the half-bridge inverter circuit according to the embodiment of FIG. 3.

Operating waveforms of the inverter circuit of this invention is similar to the one shown in FIG. 2, and operating waveforms of the start-up circuit are shown in FIG. 4. Since the basic operation mechanism and circuit configuration are the same as those described in the section concerning prior arts, herein, a description will only be given of different aspects.

FIG. 3 shows the input side of the driver circuit 2 of the inverter circuit of this invention, which includes the start-up circuit and the power-supply voltage detection circuit 33. The signal input circuit 21 receives signals HIN and LIN from the control circuit 1 of FIG. 1. The output signal PGIN from the dead time control circuit 22 is inputted to the pulse generating circuit 24, which is connected to the level shifting circuit 25 of the driver circuit 2 of FIG. 6.

The start-up circuit shown in FIG. 3 comprises a latch circuit 31 which is reset upon detection of a rise in power source on the low side, then set by a low-side output signal from a dead time control circuit 23 on the low side, a gate circuit 32, which receives the low-side output signal in response to an output from the latch circuit, then allows a high-side output signal from a dead time control circuit 22 on the high side to pass, and a start-up power-supply voltage detection circuit 33 (a UV circuit in the drawing) for detecting a rise in power-supply voltage $V_{cc}$ on the low side.

The latch circuit 31 consists of an RS flip-flop circuit (FF in the drawing), which receives an input of a detection signal from the power-supply voltage detection circuit 33 at a reset terminal R, is reset when the power-supply voltage $V_{cc}$ on the low side rises, receives an input of a low-side output signal from the dead time control circuit 23 at a set terminal S, and operates so as to prioritize the low-side output signal.

When the latch circuit 31 is set, a high-side output signal from the dead time control circuit 22 on the high side passes through the NOR gate circuit 32, and is supplied to the pulse generating circuit 24, resulting in outputting a high-side output signal HO. Although the drive circuit of FIG. 3 is a double-input type and receives two signals HIN and LIN from the control circuit 1, a single-input type drive circuit, which receives only one signal from the control circuit 1 and outputs two signals corresponding to HIN and LIN, such as shown in FIG. 6, may be also used in the embodiment.

Referring to FIG. 4, operations at start-up will be described.

Before a rising signal in the power-supply voltage $V_{cc}$ exceeds a reference voltage $V_{REF}$, the latch circuit 31 is reset by an output from the power-supply voltage detection circuit 31. For input signals LIN and HIN into the input circuit 21, dead times are provided so that simultaneous turning-on does not occur, and when the input signal HIN arrives first after the rising signal in the power-supply voltage $V_{cc}$ exceeds the reference voltage $V_{REF}$, since the latch circuit 31 has not been set, this signal does not pass through the gate circuit 32. The latch circuit 31 is set by the first arrival input signal LIN, whereby the next input signal HIN passes through the gate signal 32.

Now, referring to FIGS. 5A, 5B, a detailed circuit configuration and operations of a comparator circuit 331 of the power-supply voltage detection circuit 33 will be described.

Figure 5A:
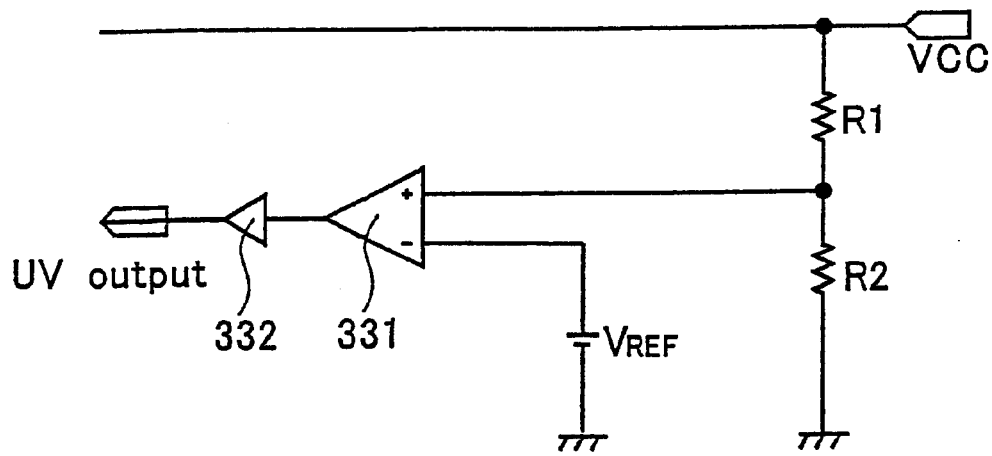
FIG. 5A is a diagram for explaining a start-up circuit and FIG. 5B is a diagram for explaining operating waveforms of the half-bridge inverter circuit including the circuit of FIG. 5A.

First, the power-supply voltage detection circuit 33 shown in FIG. 5A comprises two split resistances R1 and R2, which are connected between the power source voltage $V_{cc}$ on the low side and ground, a comparator circuit 331 which is provided with a noninverting input terminal (+in the drawing), into which a rising signal in the power-supply voltage $V_{cc}$ from the junction between the two split resistances R1 and R2 is inputted, and an inverting input terminal (−in the drawing), into which a reference voltage $V_{REF}$ is inputted, and an inverter circuit 332 for inverting an output from the comparator 331.

Figure 5B:
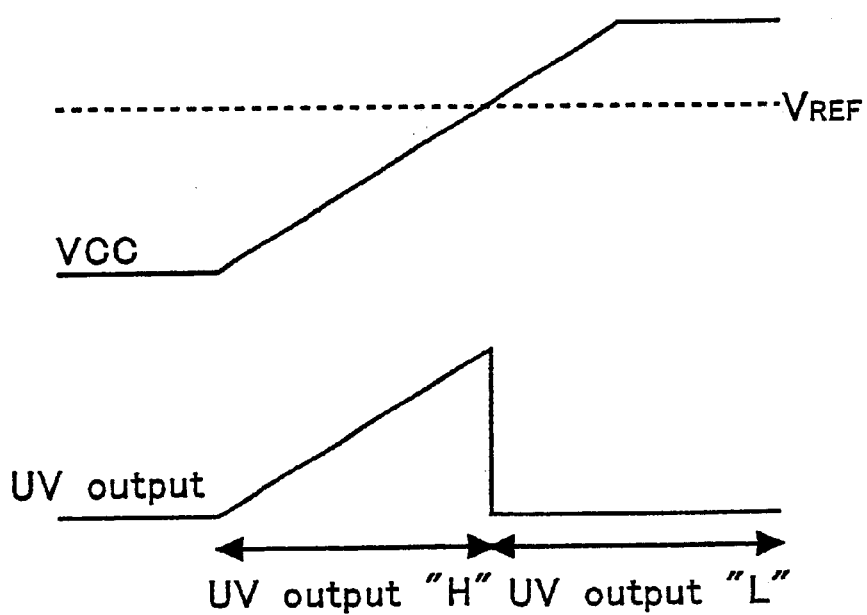

In such a comparator circuit 331, as shown in FIG. 5B, at start-up, the rising signal in the power-supply voltage $V_{cc}$ from the junction between the two split resistance R1 and R2 and the reference voltage $V_{REF}$ are compared by the comparator circuit 331, an output from the power supply detection circuit 33 becomes high level until the power-supply voltage $V_{cc}$ reaches the reference voltage $V_{REF}$, and the output from the power supply detection circuit 33 becomes low level after the rising signal in the power-supply voltage $V_{cc}$ exceeds the reference voltage $V_{REF}$. Accordingly, before the rising signal in the power-supply voltage $V_{cc}$ exceeds the reference voltage $V_{REF}$, the latch circuit is reset and subsequently, the latch circuit 31 is set by a low-side output signal from the low-side dead time control circuit 23. As a result, since operation is carried out, at a start-up time, while prioritizing the low-side signal, electric supply to the high-side boot-strap configuration is supplied after the main switching element Q2 is turned on, therefore a sufficient initial charging can be given to the high-side boot-strap configuration.

The above embodiment of the invention may be applied to various types of input circuits 21 including a self-excitation type with an internal oscillator, a double input/double output type and a single input/double output type, as described above. As a modification to the embodiment of the invention, when a double input/double output type is used as the input circuit 21, signals in which dead time is already created may be inputted to the input circuit 21 for eliminating the dead time controller circuit 22 on the high side and the dead time controller circuit 23 on the low side. Other obvious modifications may occur to a person skilled in the art. Those modifications will be included in the scope of this invention.

What is claimed is:

1. A half-bridge inverter circuit comprising:

a switching circuit of a half-bridge type comprising a first main switching element on a high side and a second main switching element on a low side; and a drive circuit outputting a high side output signal and a low side output signal for driving the switching circuit with a dead time period, the driver circuit comprising a first dead time control circuit on the high side and a second dead time control circuit on the low side, the first and second dead time control circuits cooperating to produce the dead time period, the driver circuit further comprising a start-up circuit comprising a latch circuit that is reset upon detection of a rise in power supply on the low side at start-up of the inverter circuit and is set by the low side output signal from the second dead time control circuit, and a gate circuit allowing the high side output signal from the first dead time control circuit to pass after receiving the low side output signal in response to an output from the latch circuit.

2. The half-bridge inverter circuit of claim 1, wherein each of the first main switching element and the second main switching element comprises a power MOSFET.

3. The half-bridge inverter circuit of claim 1, wherein the latch circuit comprises an RS flip-flop circuit, a detection signal sent at the start-up from a power-supply voltage detection circuit for detecting a rise in power supply on the low side being applied to a reset terminal of the flip-flop circuit and the low side output signal from the second dead time control circuit being applied to a set terminal of the flip-flop circuit.

4. The half-bridge inverter circuit of claim 1, wherein the gate circuit comprises a NOR gate and receives the high side output signal from the first dead time control circuit and the output from the latch circuit.

* * * * *